United States Patent
Lee et al.

(10) Patent No.: US 9,261,420 B2
(45) Date of Patent: Feb. 16, 2016

(54) DIGITAL DEVICE AND METHOD FOR MEASURING THE AXIAL LOAD OF A TORQUE-SHEAR-TYPE HIGH STRENGTH BOLT

(75) Inventors: Hyeon Ju Lee, Yuseong-gu (KR); Hwan Seon Nah, Daejeon (KR); Kang Seok Kim, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 593 days.

(21) Appl. No.: 13/704,570

(22) PCT Filed: May 3, 2011

(86) PCT No.: PCT/KR2011/003299
§ 371 (c)(1), (2), (4) Date: Dec. 14, 2012

(87) PCT Pub. No.: WO2011/159022
PCT Pub. Date: Dec. 22, 2011

(65) Prior Publication Data
US 2013/0085686 A1   Apr. 4, 2013

(30) Foreign Application Priority Data
Jun. 14, 2010   (KR) .......................... 10-2010-0055920

(51) Int. Cl.
*G01L 5/24*   (2006.01)
*B25B 23/14*  (2006.01)
(Continued)

(52) U.S. Cl.
CPC . *G01L 3/02* (2013.01); *B25B 23/14* (2013.01); *B25B 23/1415* (2013.01); *G01L 5/0042* (2013.01); *G01L 5/24* (2013.01); *G06F 17/18* (2013.01)

(58) Field of Classification Search
CPC .......................................................... G01L 5/24
USPC .............................................................. 702/41
See application file for complete search history.

(56) References Cited

U.S. PATENT DOCUMENTS

2005/0223804 A1* 10/2005 Nakamura ...................... 73/581

FOREIGN PATENT DOCUMENTS

| JP | 55-134333 A | 10/1980 |
|----|-------------|---------|
| JP | 6-62341 U   | 9/1994  |

(Continued)

OTHER PUBLICATIONS

Japanese Office Action, w/ English translation thereof, issued in Japanese Patent Application No. JP 2013-515253 dated Dec. 17, 2013.

(Continued)

*Primary Examiner* — Bryan Bui
(74) *Attorney, Agent, or Firm* — McDermott Will & Emery LLP

(57) ABSTRACT

The present invention relates to a digital device and a method for measuring the axial load of a torque-shear-type high strength bolt. One embodiment of the digital device of the present invention includes: a main body portion which is connected to an electromotive wrench fastening a torque-shear-type high strength bolt; a measurement portion disposed at the main body portion to measure the axial load of the torque-shear-type high strength bolt using a quantity of the electricity from the electromotive wrench; a power supply portion disposed at the main body portion and including a power lead-in portion for receiving an external power supply and a power lead-out portion for supplying power to the electromotive wrench; and a display portion displaying the axial force value measured by the measurement portion.

13 Claims, 12 Drawing Sheets

(51) Int. Cl.
*G01L 3/02* (2006.01)
*G06F 17/18* (2006.01)
*G01L 5/00* (2006.01)

(56) References Cited

FOREIGN PATENT DOCUMENTS

| | | |
|---|---|---|
| JP | 2756245 B2 | 5/1995 |
| JP | 10-329051 A | 12/1998 |
| JP | 2006-308342 A | 11/2006 |
| KR | 10-2006-0059844 | 6/2006 |
| KR | 10-2009-0015359 | 2/2009 |
| KR | 10-2009-0126340 | 12/2009 |

OTHER PUBLICATIONS

Kim, Jin Ho et al., "Experimental Study for Clamping force of High Strength Bolts with regard to Construction field's Temperature", RIST thesis, 2007, vol. 21, No. 4, pp. 275-280.
International Search Report mailed Jan. 11, 2012 issued in corresponding International Application No. PCT/KR2011/003299.
Notice of Allowance issued in Japanese Application No. 2013-515253 dated Apr. 8, 2014.

* cited by examiner

US 9,261,420 B2

DIGITAL DEVICE AND METHOD FOR MEASURING THE AXIAL LOAD OF A TORQUE-SHEAR-TYPE HIGH STRENGTH BOLT

RELATED APPLICATIONS

This application is the U.S. National Phase under 35 U.S.C. §371 of International Application No. PCT/KR2011/003299, filed on May 3, 2011, which in turn claims the benefit of Korean Application No. 10-2010-0055920, filed on Jun. 14, 2010, the disclosures of which Applications are incorporated by reference herein.

TECHNICAL FIELD

The present invention relates to a digital device and method for measuring axial load, and more particularly, to a digital device and method for measuring an axial load of a torque-shear-type high strength bolt.

BACKGROUND ART

A torque-shear (TS)-type high strength bolt generally used in a bolt joint for a steel frame structure is regulated in the standard specifications for building construction, and is subjected to axial load introduction (fastening) and axial load test under torque management rules based on the standard.

It has been known that a proper axial load is introduced if a pintail of the torque-shear-type high strength bolt fastened by the torque management rules is fractured. Therefore, the axial load of the torque-shear-type strength bolt has been estimated and predicted by testing an actually introduced fastening axial load based on correlation between a torque coefficient and torque through an axial load tester in a conventional site.

However, the torque coefficient is varied depending on many external factors, such as a stored state of the bolt, nonuse of a provisional bolt, exposure to air and water penetration due to outstanding fastening of the day, attachment of foreign matter, product damage, etc.

Therefore, the actually introduced axial load is significantly different from an estimated value. Thus, there arise problems that the actually introduced axial load is not only inexactly determined but also frequently falls short of the design standard.

Also, there arises a problem that the high strength bolt falling short of the design standard is difficult to replace or be additionally fastened due to difficulty in measurement of the axial load immediately after fastening on site.

To secure the proof stress of the high strength bolt joint for the steel frame structure, it is necessary to introduce a stable axial load variable within a narrow range into the bolt. Accordingly, there is a need for solving the problem that the actually introduced axial load is significantly varied depending on change in the torque coefficient due to the foregoing external environmental factors.

Also, there is a need for immediately measuring the axial load of the high strength bolt after fastening in order to improve quality management regarding the fastening axial load.

DISCLOSURE

Technical Problem

One embodiment of the present invention provides a digital device for measuring an axial load, which can measure the axial load of the torque-shear-type high strength bolt immediately after fastening.

Another embodiment of the present invention provides a method for measuring an axial load of a torque-shear-type high strength bolt, in which the axial load of the torque-shear-type high strength bolt is quantified and verified, thereby solving the problem in the art that the actually introduced axial load is largely varied depending on change in a torque coefficient due to external environmental factors.

Technical Solution

In accordance with one aspect of the present invention, a digital device for measuring an axial load of a torque-shear-type high strength bolt includes: a main body connected to an electromotive wrench fastening a torque-shear-type high strength bolt; a measuring unit disposed in the main body and measuring an axial load of the torque-shear-type high strength bolt based on a current amount of the electromotive wrench; a power supply formed in the main body and comprising a power lead-in portion for receiving power from outside and a power lead-out portion for supplying the power to the electromotive wrench; and a display unit displaying a measuring result of the axial load of the torque-shear-type high strength bolt measured by the measuring unit.

The digital device may further include an output unit formed in the main body and outputting data measured by the measuring unit to the outside.

The digital device may further include a connector formed in the main body and connected to a separate terminal so that the measuring unit can be repaired, maintained and managed through the terminal.

The measuring unit may include a current detector for detecting alternating current (AC) supplied to the electromotive wrench through a current sensor using a DC voltage of 0 to 5V; and a sampling unit for performing sampling within a preset range with respect to the electric current detected by the current detector; and a calculation unit for analyzing a data value sampled by the sampling unit based on an axial load calculation algorithm and calculating the axial load.

The measuring unit may further include a data storage unit which timely stores measurement data of the axial load according to time calculated by the calculation unit.

The sampling unit may start the sampling within the preset range when a signal of a first level or more is sensed after a signal sensed by the current detector is lower than or equal to the first level and is continued for a first period of time or more, and terminate the sampling when the signal sensed by the current detector is lower than or equal to a second level and is continued for a second period of time.

The calculation unit may set a maximum value, among data collected within a predetermined period of time till a time point of terminating the sampling, as a maximum current level immediately before fracture of a pintail of the torque-shear-type high strength bolt.

The calculation unit may set the maximum current level as a reference level, stores in the data storage unit all of the data collected within the predetermined period of time up to termination of sampling, calculate the sum of data higher than the reference level by a predetermined level or more among the data according to the axial load calculation algorithm, and enter the sum to a preset formula to calculate the axial load.

In accordance with an aspect of the present invention, a method for measuring an axial load of a torque-shear-type high strength bolt includes: the first step of obtaining an accumulated current amount from an electromotive wrench fastening a torque-shear-type high strength bolt until a pintail of the torque-shear-type high strength bolt is fractured; the second step including the step of measuring an axial load of the torque-shear-type high strength bolt according to a normal condition and abnormal conditions, the step of quantifying the axial load by weighting the axial load measured according to the conditions; and the step of searching the accumulated current amount in a one-to-one relationship with the axial load; the third step comprising the step of setting a maximum current amount, at a time point when the pintail of the torque-shear-type high strength bolt is fractured, as a reference value, and sampling data by quantifying the accumulated current amount into equal divisions in a unit of 10%, the step of applying variance analysis to the axial load and accumulated current amount quantified at the second step through a statistical management method, and the step of calculating a regression analysis estimating expression between the value obtained by integrating the data and the axial load; and the fourth step of estimating the axial load from the accumulated current amount through the regression analysis estimating expression.

The method may further include, after the fourth step, the fifth step of testing whether the axial load estimated from the accumulated current amount is within reliability of 95%.

The fifth step may include performing reliability testing using twin-t test.

The first step may include setting the maximum current amount, at a time point when the pintail of the torque-shear-type high strength bolt is fractured, as the reference value, and setting a certain time point, before the time point when the pintail of the torque-shear-type high strength bolt is fractured, to obtain the accumulated current amount from the certain time point to the time point when the pintail of the torque-shear-type high strength bolt is fractured.

The following regression analysis estimating expression 1 may be obtained using data corresponding to 30% from a maximum current level of the electric current accumulated for 1.5 seconds before the time point when the pintail of the torque-shear-type high strength bolt is fractured.

$$Y=24.78+0.02333X \quad \text{[Regression analysis estimating expression 1]}$$

where Y is a target axial load (kN), and X is an accumulated current amount (A) obtained from the electromotive wrench.

The following regression analysis estimating expression 2 is obtained using data corresponding to 60% from the maximum current level of the electric current accumulated for 1.5 seconds before the time point when the pintail of the torque-shear-type high strength bolt is fractured.

$$Y=55.74+0.02718X \quad \text{[Regression analysis estimating expression 1]}$$

where Y is an axial load (kN) to be desired, and X is an accumulated current amount (A) obtained from the electromotive wrench.

Advantageous Effects

According to embodiments of the present invention, a digital device connected to an electromotive wrench is provided to measure axial load of a torque-shear-type high strength bolt immediately after fastening, whereby the high strength bolt can be more easily replaced or additionally fastened, thereby improving quality management regarding the fastening axial load.

Also, the method for measuring an axial load of a torque-shear-type high strength bolt is used to quantify and verify the axial load of the torque-shear-type high strength bolt, thereby solving the problem in the art that the actually introduced axial load is significantly varied depending on change in a torque coefficient due to external environmental factors.

DESCRIPTION OF REFERENCE NUMERALS

| 10: power source | 20: digital axial load measurement device |
|---|---|
| 30: electromotive wrench | 40: high strength bolt |
| 50: nut | 60: joint member |
| 100: main body | 120: output unit |
| 140: connector | 200: measuring unit |
| 220: current detector | 240: sampling unit |
| 260: calculation unit | 280: data storage unit |
| 300: power supply | 320: power lead-in portion |
| 340: power lead-out portion | 400: display unit |

BEST MODE

Hereinafter, embodiments of the present invention will be described in detail with reference to accompanying drawings.

Figure 1:
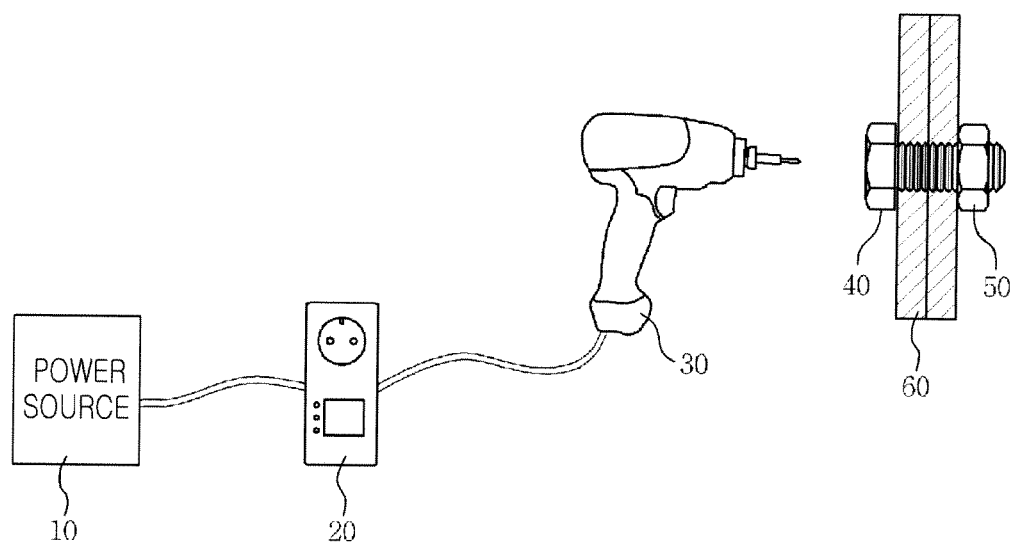
FIG. 1 is a conceptual view of a digital device for measuring an axial load according to one embodiment of the present invention.
Figure 2:
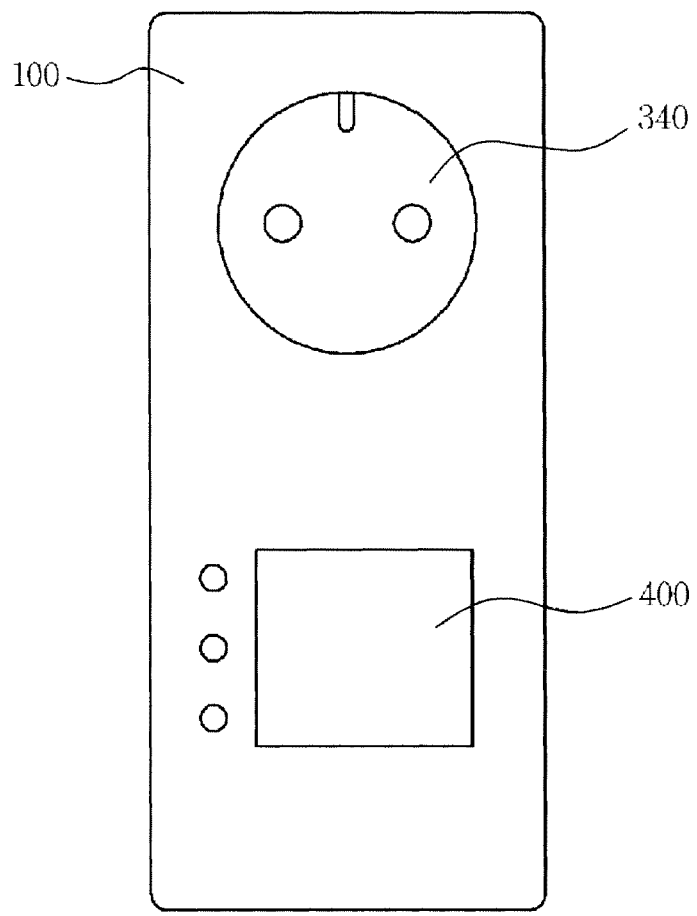
FIG. 2 is a front view of the digital device of FIG. 1.
Figure 3:
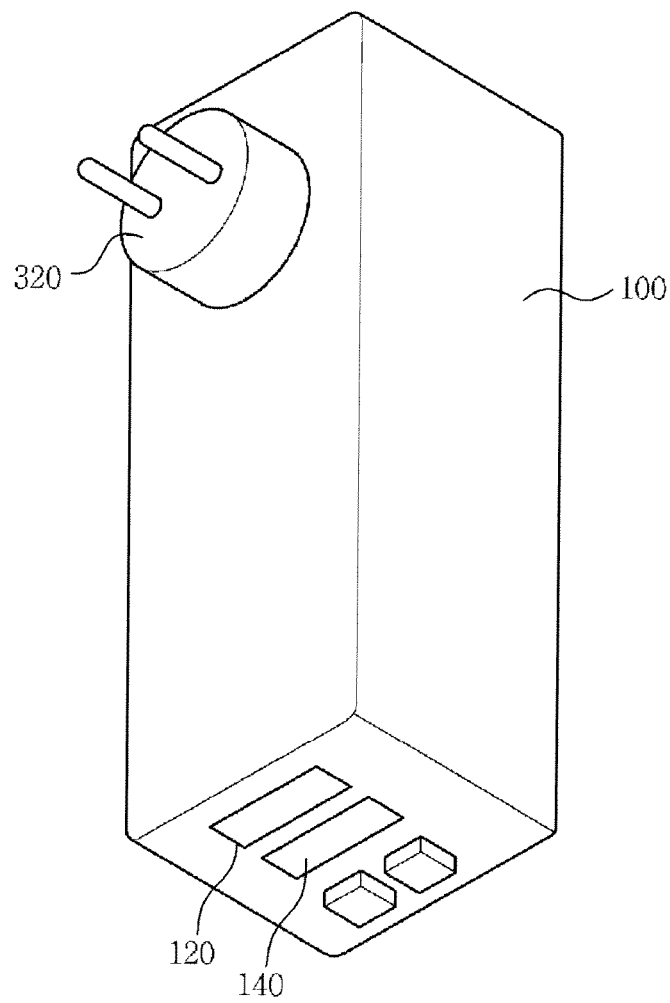
FIG. 3 is a perspective view of the digital device of FIG. 1.

FIG. 1 is a conceptual view of a digital device for measuring an axial load (hereinafter, referred to as a digital axial load measurement device) according to one embodiment of the present invention, and FIGS. 2 and 3 are front and perspective views thereof.

Referring to FIG. 1, a digital axial measuring device 20 is connected to an electromotive wrench 30, which is used to fasten the high strength bolt 40 to a joint member 60, and measures axial load of the torque-shear-type high strength bolt immediately after fastening.

Specifically, referring to FIGS. 2 and 3, the digital axial load measurement device includes a main body 100 connected to the electromotive wrench 30 for fastening the torque-shear-type high strength bolt; a measuring unit 200 disposed in the main body 100 and measuring the axial load of the torque-shear-type high strength bolt based on a current amount of the electromotive wrench 30; a power supply 300 including a power lead-in portion 320 for receiving power from an external power source 10 and a power lead-out portion 340 for supplying the power to the electromotive wrench 30; and a display unit 400 which displays a measuring result of the axial load of the torque-shear-type high strength bolt measured by the measuring unit 200.

The digital axial load measurement device may further include an output unit 120 found in the main body 100 and outputting data measured by the measuring unit 200 to the outside. Further, the digital axial load measurement device may further include a connector 140 connected to a separate terminal (not shown) such that the measuring unit 200 can be repaired, maintained and managed through the terminal.

The main body 100 may have any configuration as long as it can include the measuring unit 200, the power supply 300 and the display unit 400. For example, the main body 100 may have a rectangular parallelepiped shape of a portable size.

The measuring unit 200 serves to measure the axial load, which will be described in detail below.

The power supply 300 includes the power lead-out portion 340 on a front side thereof to supply the power to the electromotive wrench 30, and the power lead-in portion 320 on a rear side thereof to receive power from the power source 10.

The power lead-out portion 340 and the power lead-in portion 320 may be realized by any power plug known in the art. The digital axial load measurement device may receive the power from the external power source 10 by installing an AC power plug, and the power from the power source 10 may include DC power used for the measuring unit 200, the display unit 400, the output unit 120, the connector 140, etc., and AC power used for operating the electromotive wrench 30. Here, the DC power may be supplied through a converter, and the AC power may be supplied through a current sensor described below.

The display unit 400 displays the measured axial load on the main body 100. For example, the display unit 400 may include an LCD or the like.

The output unit 120 serves to output data obtained by the measuring unit 200. For example, the output unit 120 may constitute a memory card port on a lower side of the main body 100 in order to output the data (see FIG. 3).

The connector 140 serves to repair, maintain and manage a program used in the measuring unit 200. The connector 140 may be formed on the lower side of the main body 100 such that a separate terminal and the digital axial load measurement device 20 can be connected thereto via a cable or the like. For example, the connector 140 may include a USB port.

Figure 4:
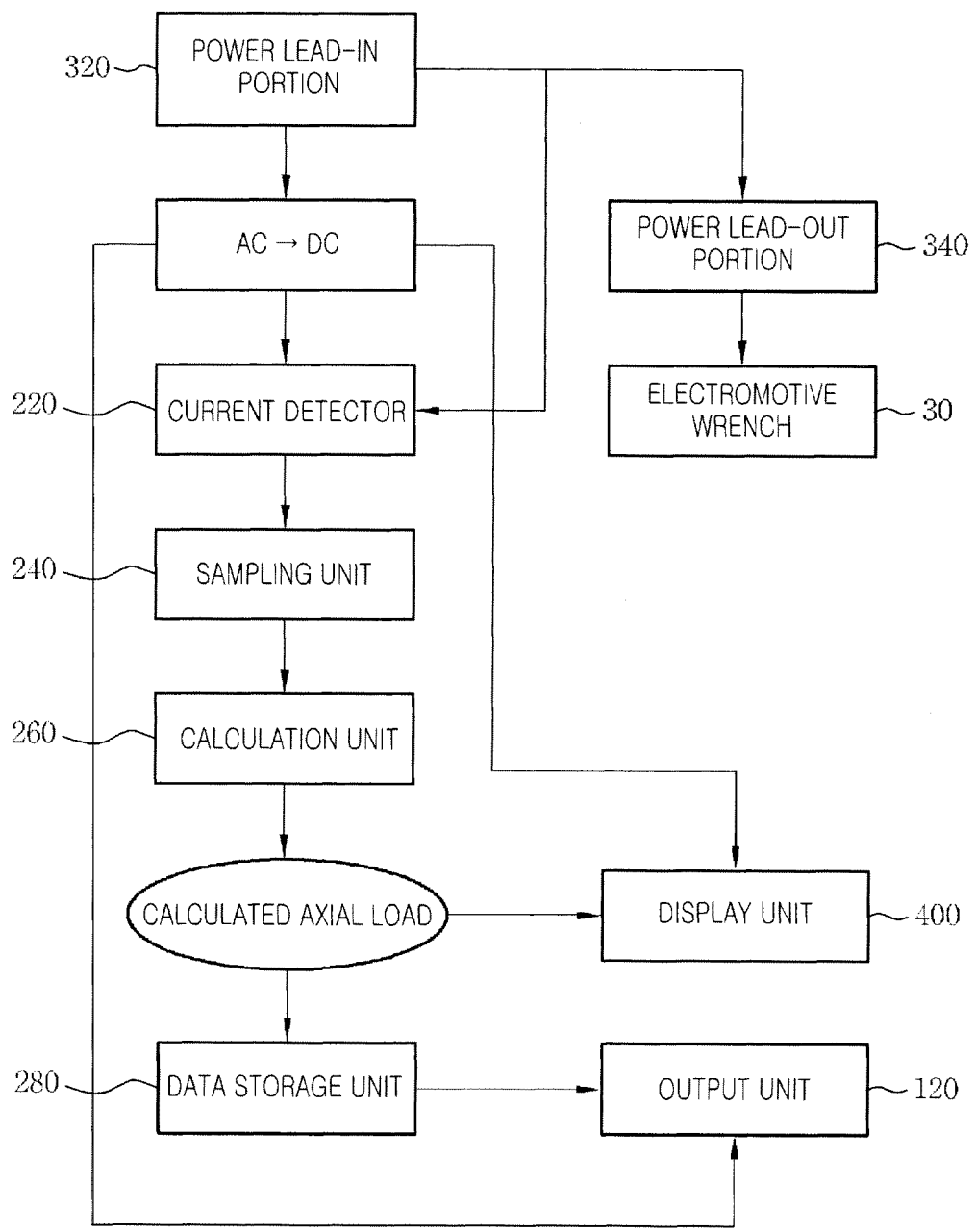
FIG. 4 is a block diagram showing operations of the digital device of FIG. 1.

FIG. 4 is a block diagram showing operations of the digital device of FIG. 1.

Referring to FIG. 4, the measuring unit 200 includes a current detector 220 for detecting alternating current (AC) supplied to the electromotive wrench 30 through the current sensor (not shown) using a DC voltage of 0 to 5V; a sampling unit 240 for performing sampling within a preset range with respect to the electric current detected by the current detector 220; and a calculation unit 260 for analyzing a data value sampled by the sampling unit 240 based on an axial load calculation algorithm and calculating the axial load.

The measuring unit 200 may further include a data storage unit 280 which stores measurement data of the axial load according to time calculated by the calculation unit 260.

The sampling unit 240 may be configured to start the sampling within a preset range when a signal of a first level or more is sensed after a signal sensed by the current detector 220 is lower than or equal to the first level and is continued for a first period of time or more, and terminate the sampling when a signal sensed by the current detector 220 is lower than or equal to a second level and is continued for a second period of time.

For example, the sampling unit 240 may set the first level to 0.03 Volts, the first period of time to 1 second, the second level to 0.03 Volts, and the second time to 0.2 seconds. Further, the sampling may have a preset range of 10,000/sec. The process of measuring the axial load is as follows.

First, the sampling unit 240 starts sampling when a current higher than or equal to 0.03 Volts is sensed after the signal sensed by the current detector 220 is 0.03 Volts or less (i.e., the first level) and is continued for 1 second or more (i.e., the first period of time), and samples 10,000 data points per second.

Next, the sampling unit 240 terminates the sampling when the signal sensed by the current detector 220 is 0.03 Volts or less (i.e., the second level) and is continued for 0.2 seconds (i.e., the second period of time).

Then, the maximum level of the current is searched in order to apply the axial load calculation algorithm. The maximum level is set as a maximum current level immediately before fracture of the pintail of the torque-shear-type high strength bolt, among the data collected within a predetermined period of time up to termination of sampling.

That is, assuming that the preset range of the sampling is 10,000/sec, the data collected within the predetermined period of time may be, for example, 30,000 data calculated within 3 seconds.

Also, the maximum current level means a maximum level of electric current except the starting current. Meanwhile, the axial load calculation algorithm may be a typical axial load calculation algorithm, or an axial load measurement method described below in more detail.

The calculation unit 260 sets the maximum current level as a reference level, and stores all of the data collected within the predetermined period of time up to termination of sampling in the data storage unit 280. Among the data, the sum of data higher than the reference level by a predetermined level or more (e.g., 0% or more) is calculated by the axial load calculation algorithm, and the sum is then substituted into a preset formula, thereby calculating the axial load.

The axial load calculated as above may be displayed on the display unit 400, and the data stored in the data storage unit 280 may be output to the outside through the output unit 120. Here, the formula refers to a current-axial load formula which can be expressed in the form of regression analysis expression.

As described above, the digital axial load measurement device according to the embodiment of the present invention measures the axial load of the torque-shear-type high strength bolt immediately after fastening, whereby the high strength bolt can be more easily replaced or additionally fastened, thereby improving quality management regarding the fastening axial load.

Figure 5:
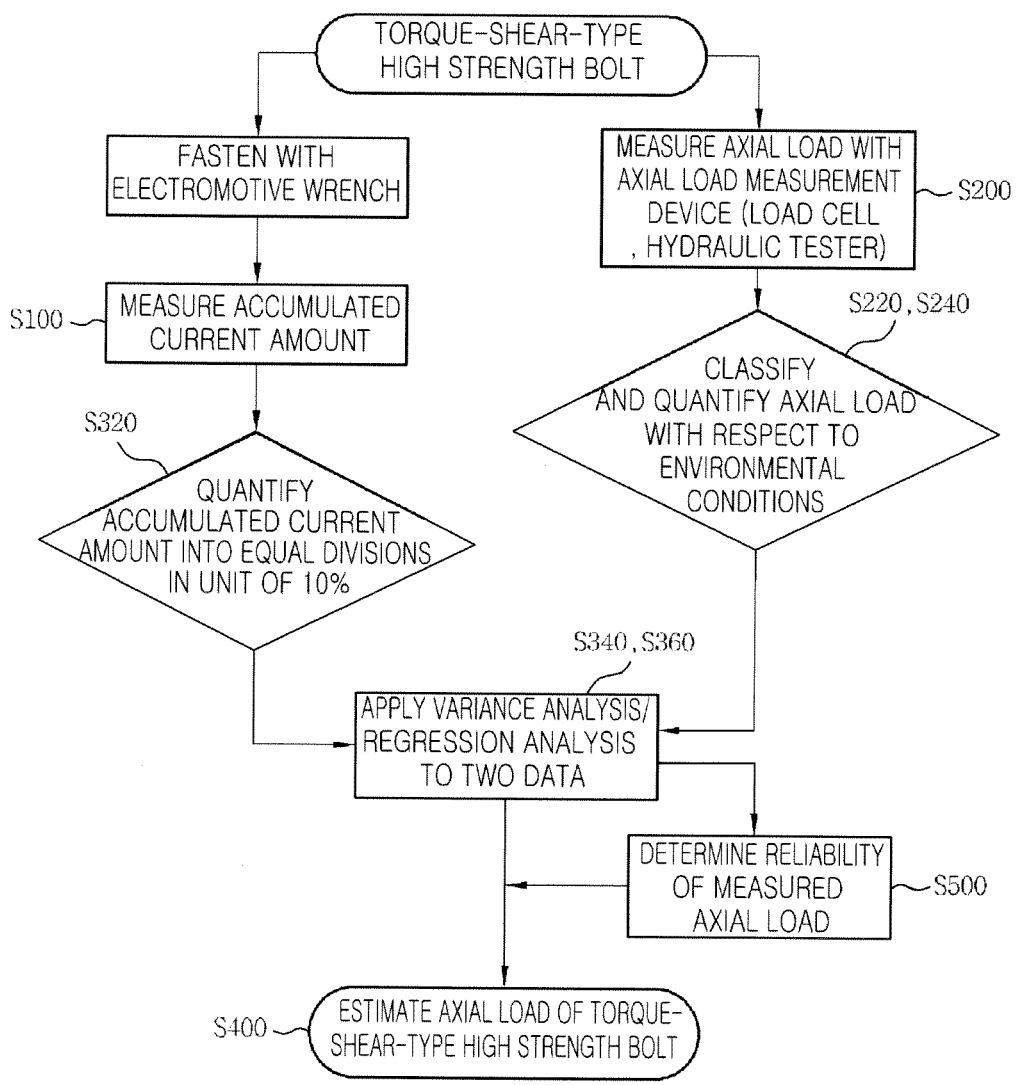
FIG. 5 is a flowchart of a method for measuring an axial load of a torque-shear-type high strength bolt according to one embodiment of the present invention.
Figure 6:
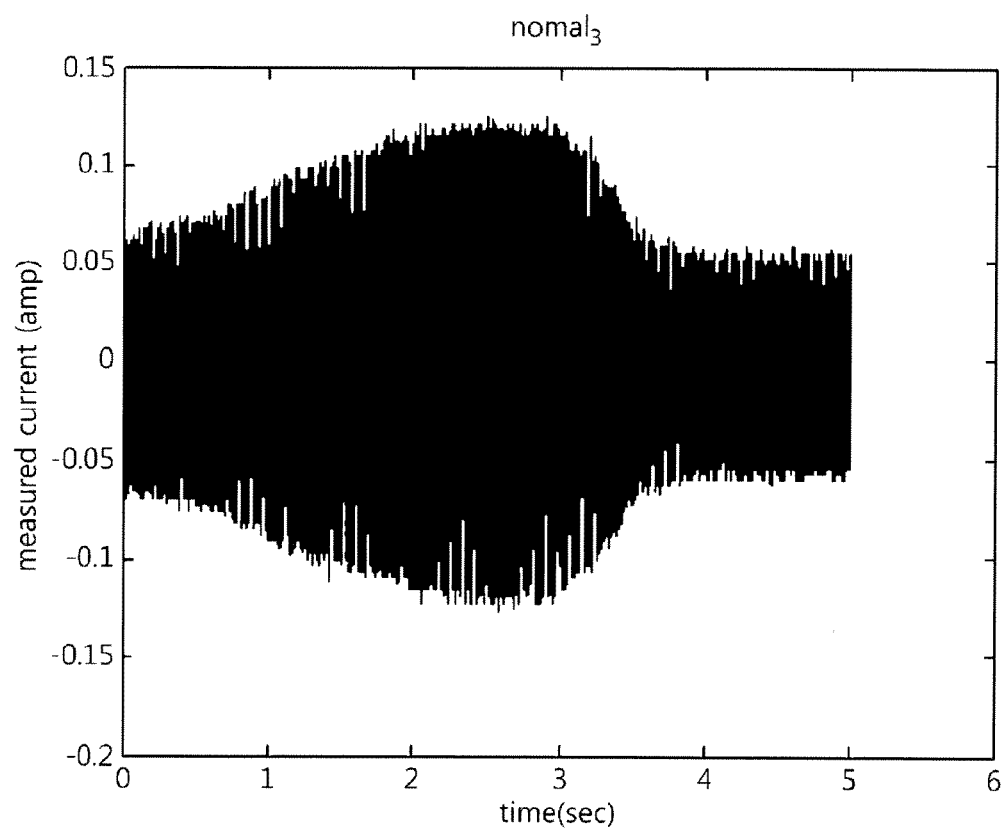
FIG. 6 is a graph depicting an accumulated current amount of the torque-shear-type high strength bolt under a normal condition.
Figure 7:
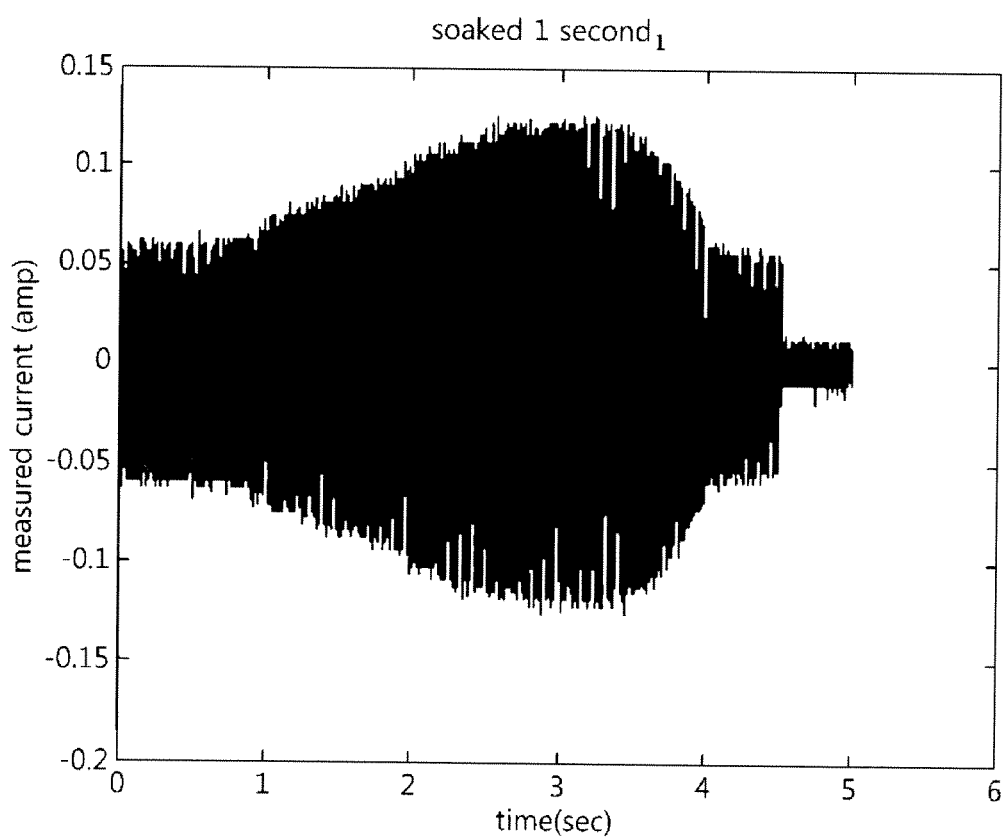
FIG. 7 is a graph depicting an accumulated current amount of the torque-shear-type high strength bolt under a condition of water penetration for 1 second.
Figure 8:
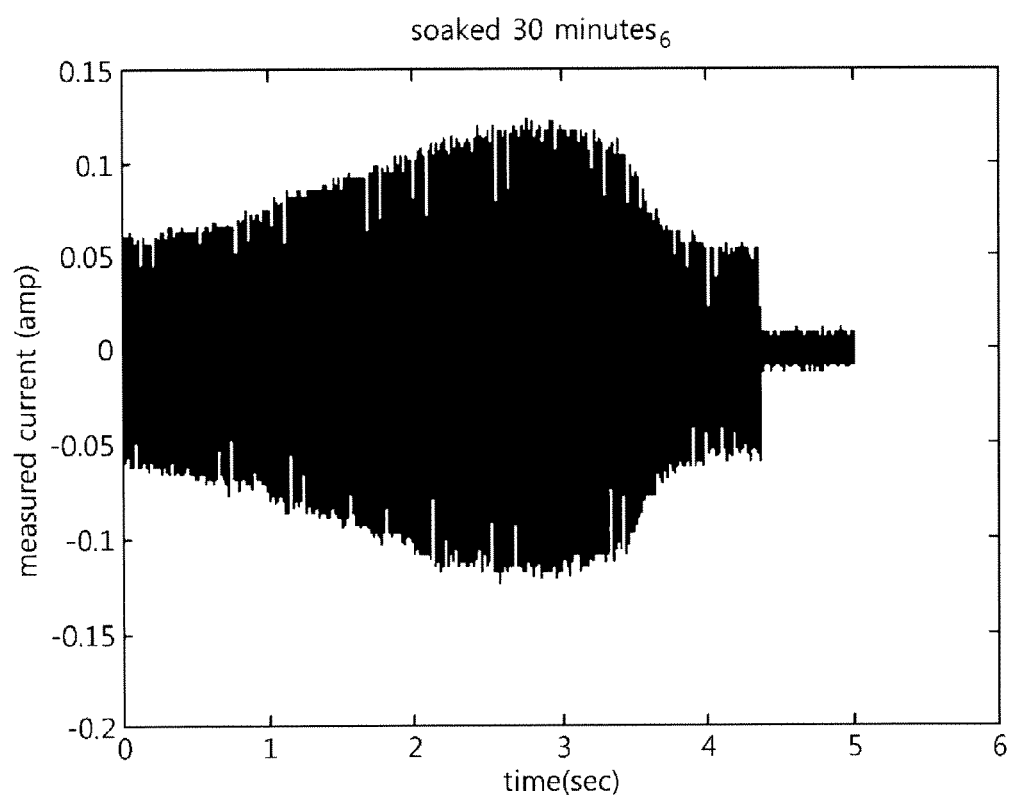
FIG. 8 is a graph depicting an accumulated current amount of the torque-shear-type high strength bolt under a condition of water penetration for 30 minutes.
Figure 9:
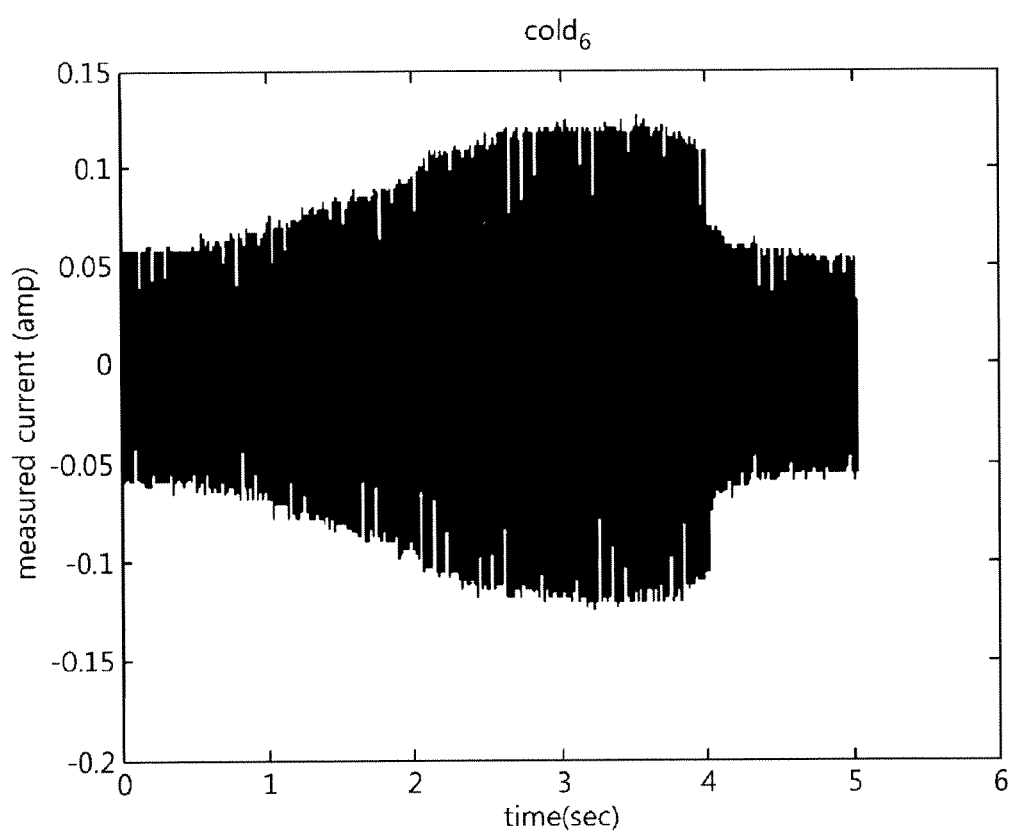
FIG. 9 is a graph depicting an accumulated current amount of the torque-shear-type high strength bolt under a condition of exposure at 3 degrees below zero.
Figure 10:
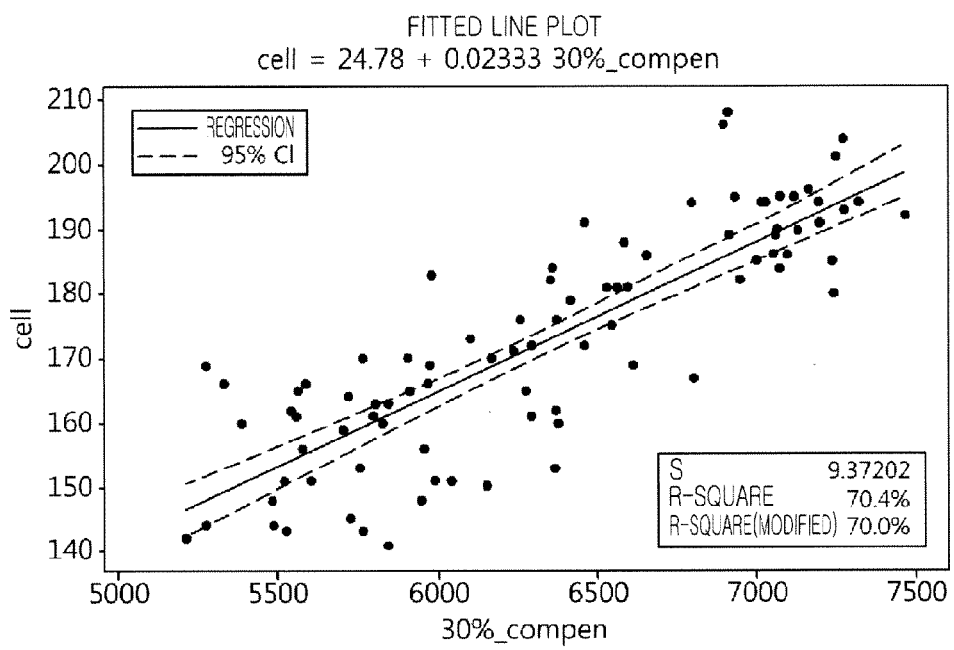
FIG. 10 is a graph depicting a regression analysis model of an estimated axial load when the accumulated current amount reaches 30% of the maximum current amount.
Figure 11:
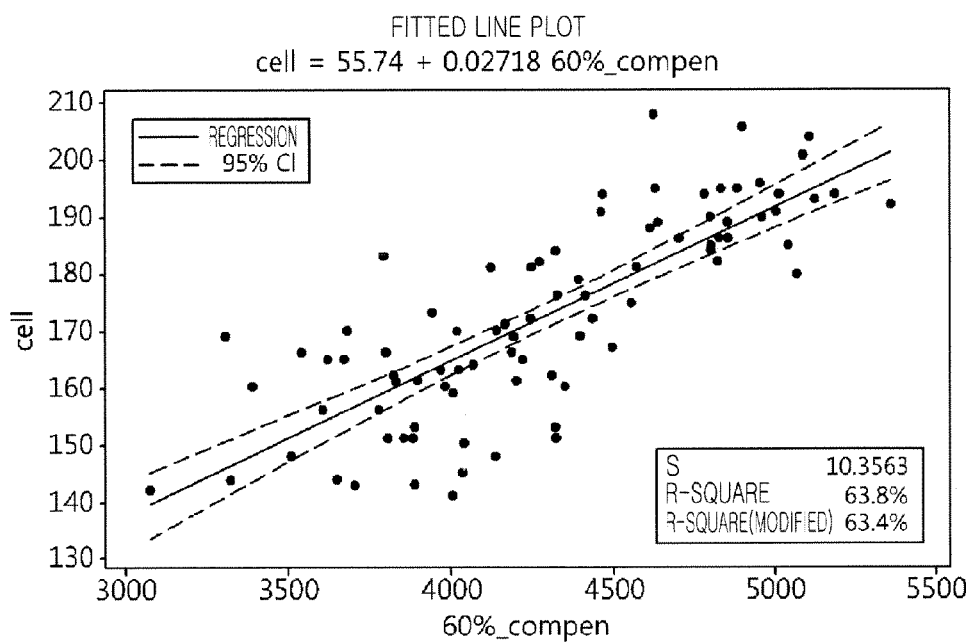
FIG. 11 is a graph depicting a regression analysis model of an estimated axial load when the accumulated current amount reaches 60% of the maximum current amount.
Figure 12:
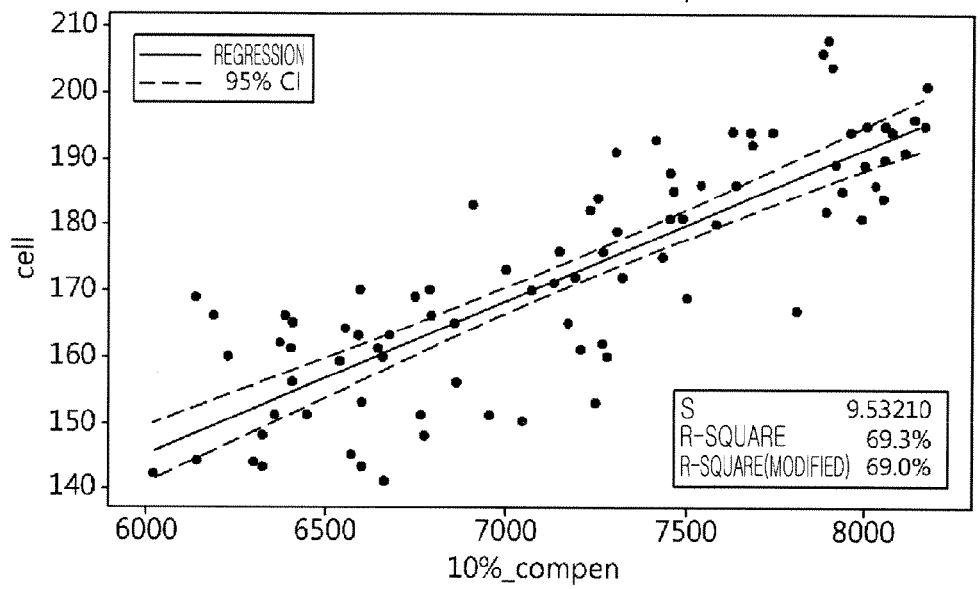
FIG. 12 is a graph depicting a regression analysis model of an estimated axial load when the accumulated current amount reaches 10% of the maximum current amount.
Figure 13:
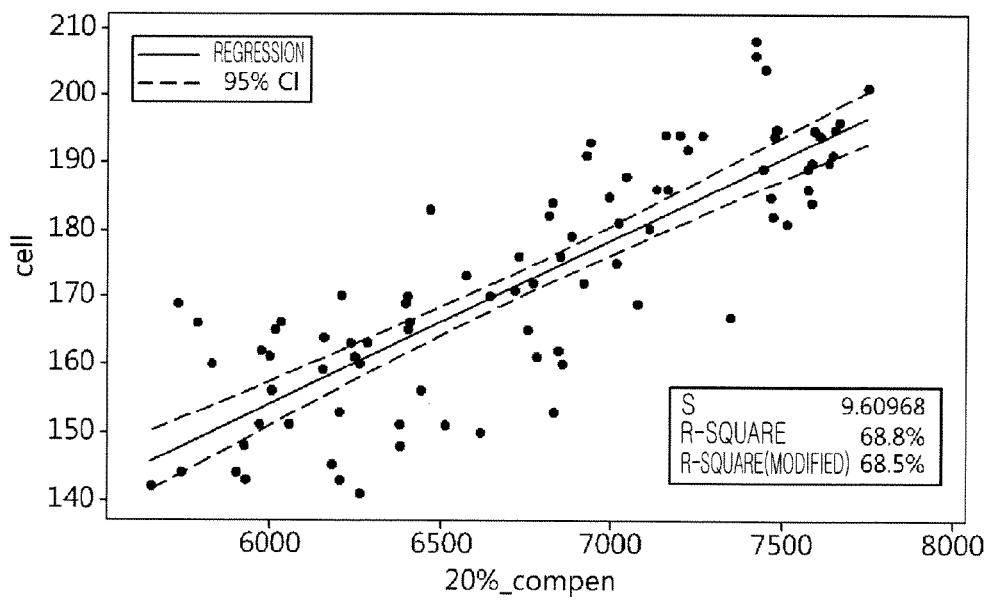
FIG. 13 is a graph depicting a regression analysis model of an estimated axial load when the accumulated current amount reaches 20% of the maximum current amount.
Figure 14:
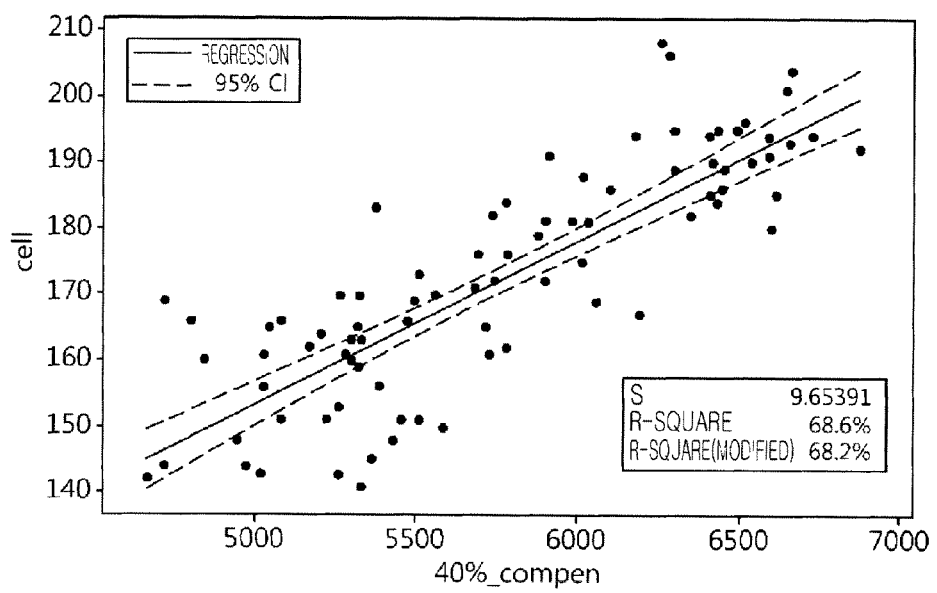
FIG. 14 is a graph depicting a regression analysis model of an estimated axial load when the accumulated current amount reaches 40% of the maximum current amount.
Figure 15:
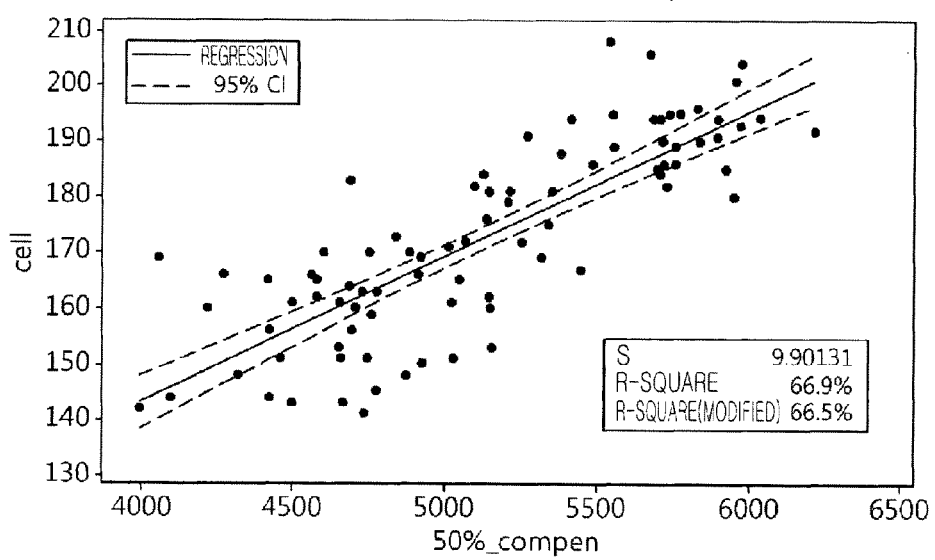
FIG. 15 is a graph depicting a regression analysis model of an estimated axial load when the accumulated current amount reaches 50% of the maximum current amount.

FIG. 5 is a flowchart of a method for measuring an axial load of a torque-shear-type high strength bolt according to one embodiment of the present invention.

Referring to FIG. 5, the method of measuring the axial load of the torque-shear-type high strength bolt according to the embodiment (hereinafter, referred to as an axial load measurement method of the torque-shear-type high strength bolt) includes the first step S100 of obtaining an accumulated current amount from an electromotive wrench 30 fastening a torque-shear-type high strength bolt until a pintail of the torque-shear-type high strength bolt 40 is fractured; the second step S300 of searching the accumulated current amount in a one-to-one relationship with the axial load measured by the axial load measurement device for the torque-shear-type high strength bolt; the third step S300 of calculating a regression analysis estimating expression between the axial load and the accumulated current amount; and the fourth step S400 of estimating the axial load from the accumulated current amount through the regression analysis estimating expression.

After the fourth step S400, the method may further include the fifth step S500 of testing whether the axial load estimated from the accumulated current amount is within reliability of 95%.

The estimation method may employ twin-t test.

Specifically, the first step S100 includes setting the maximum current amount, at a time point when the pintail of the torque-shear-type high strength bolt is fractured, as the reference value, and setting a certain time point, before the time point when the pintail of the torque-shear-type high strength bolt is fractured, to obtain the accumulated current amount from the certain time point to the time point when the pintail of the torque-shear-type high strength bolt is fractured.

For example, the accumulated current amount is data obtained from the electromotive wrench, and means the current amount used for driving the electromotive wrench from the starting current until the pintail of the high strength bolt is fractured.

For instance, the accumulated current amount may be obtained by measuring and storing data of 10,000 times per second through an oscilloscope.

The second step S200 may further include step S220 of measuring the axial load of the torque-shear-type high strength bolt according to a normal condition and abnormal conditions, and step S240 of quantifying the axial load by weighting the axial load measured according to the conditions.

The normal condition and the abnormal condition may, for example, be classified into a factory shipment state (i.e., a normal condition), a state in which the bolt of the factory shipment is dipped in water for 1 second (i.e., a first abnormal condition), a state in which the bolt of the factory shipment is dipped in water for 30 minutes (i.e., a second abnormal condition), and a state in which the bolt of the factory shipment is exposed to air at −3° C. for 24 hours (i.e., a third abnormal condition).

Taking the axial load varied depending on external environmental factors into account, the conditions are classified to enhance accuracy of the measured axial load.

FIGS. 6 to 9 show graphs of the accumulated current amounts corresponding to the foregoing conditions. In the embodiments of FIGS. 6 to 9, ninety torque-shear-type high strength bolts having a diameter of 20 mm and a length of 85 mm were tested regarding the fastening. At this time, room temperature is 23° C.

The third step S300 may further include step S320 of setting the maximum current amount, at the time point when the pintail of the torque-shear-type high strength bolt is fractured, to a reference value, and sampling data by quantifying the accumulated current amount into equal divisions in a unit of 10%; step S340 of applying variance analysis to the axial load and accumulated current amount quantified at step S200 through a statistical management method; and the step of calculating the regression analysis estimating expression between the value obtained by integrating the data and the axial load.

Here, the axial load refers to a current level obtained in a general axial load measurement device for the torque-shear-type high strength bolt, in which the axial load measurement device may include a load cell and a hydraulic axial load tester.

Meanwhile, the statistical management method means a process of calculating the regression analysis estimating expression through one-way analysis of variance using software for statistical analysis. For example, Minitab may be used as the software for statistical analysis.

As described above, the method of measuring the axial load of the torque-shear-type high strength bolt according to the embodiment is used to quantify and verify the axial load of the torque-shear-type high strength bolt, thereby solving the problem in the art that the actually introduced axial load is largely varied depending on change in a torque coefficient due to external environmental factors.

EXAMPLES

FIGS. 10 to 15 show graphs of regression analysis models of the estimated axial load when the accumulated current amount reaches 10-60% of the maximum current amount. Hereinafter, results from algorithm analysis expression (regression expression) of the fastening axial load according to one example of the present invention will be described in detail with reference to FIGS. 10 to 15.

(1) Test Preparation

Both-side shearing test specimen (width 100 mm×length 420 mm×thickness 19 mm) made of a steel sheet (Model: SM490A) needed for fastening the high strength bolt Torque-shear-type high strength bolt (Model: F10T M20, diameter 20 mm and length 85 mm)

Electromotive wrench (Model: GH-242HRZ)

Load cell and hydraulic axial load tester

Current signal sensor (Model: TZ77L)

Oscilloscope (Model: LC334A)

Terminal for storing and analyzing data (Computer)

(2) Test Procedures and Results

Regression analysis was statistically obtained using data corresponding to 30% from a maximum current level of electric current accumulated for 1.5 seconds up to fracture of the pintail of the torque-shear-type high strength bolt (see FIG. 10). 90 data samples were obtained.

$$Y = 24.78 + 0.02333 * X$$

$$S = 9.37202, R2 = 70.4\%, R2 = 70.0\%$$
(modified value)     [Regression analysis estimating expression 1]

Y is a target axial load (kN) and X is an accumulated current amount (A) obtained from the electromotive wrench. Also, S is a standard deviation and R is a determination coefficient ($0 < R2 < 1$) and means high reliability when approaching 1.

Next, the axial load (kN) measured by the load cell as the existing axial load tester was compared with the axial load (kN) obtained by converting the torque into the axial load using algorithm based on experimental data, and statistical analysis was performed to check a degree of an error from the actually measured values and reliability.

As a program for performing the statistical analysis, Minitab (Ver. 1.5) was used. Statistical estimation is estimation of comparing population averages having two parent populations, and since there was a one-to-one relationship between the data obtained by the load call and the data obtained by the algorithm, twin-t test was performed. Estimation results are shown in Table 1.

TABLE 1

|  | Samples | Mean | Standard deviance | SE mean |
|---|---|---|---|---|
| Load cell | 90 | 172.60 | 17.12 | 1.80 |
| Test results | 90 | 172.09 | 8.82 | 0.93 |
| Difference | 90 | 0.51 | 14.59 | 1.54 |

95% CI of mean difference: (−2.55, 3.57)
T test of mean difference=5.34 (vs. not=5.34)
T-value=−3.14
P-value=0.002

T test (=5.34) of mean difference indicates 5.34 kN that is an allowable error of 3% of a standard axial load of 178 kN. A P value was 0.002 which is lower than 0.05, and thus null hypothesis was adopted.

That is, it was determined that the data obtained from the load cell and the data obtained from a trial product were within an allowable error range of 3% in a reliability level of 95%.

Likewise, regression analysis was statistically obtained from data corresponding to 60% of the maximum current level of the electric current accumulated for 1.5 seconds up to fracture of the pintail of the torque-shear-type high strength bolt (see FIG. 11). 90 data samples were obtained.

$$Y=55.74+0.02718*X$$

$$S=10.3563, R2=63.8\%, R2=63.4\%$$
(modified value) [Regression analysis estimating expression 2]

With regard to this, estimation was carried out through the same procedure as the foregoing test procedure, and estimation results are shown in Table 2.

TABLE 2

|  | Samples | Mean | Standard deviance | SE mean |
|---|---|---|---|---|
| Load cell | 90 | 172.60 | 17.12 | 1.80 |
| Test results | 90 | 172.18 | 7.61 | 0.80 |
| Difference | 90 | 0.51 | 15.32 | 1.61 |

95% CI of mean difference: (−2.79, 3.63)
T test of mean difference=5.34 (vs. not=5.34)
T-value=−3.05
P-value=0.003

In this case, a P value was 0.003 lower, which is than 0.05, and thus null hypothesis was adopted. That is, it was determined that the data obtained from the load cell and the data obtained from a trial product were within an allowable error range of 3% in a reliability level of 95%.

Although some embodiments have been disclosed herein, it should be understood that the present invention is not limited to these embodiments, and that various modifications, additions and substitutions can be made by a person having ordinary knowledge in the art without departing from the scope and spirit of the invention and should not be individually interpreted without considering the scope and spirit of the invention as limited only by the accompanying claims.

The invention claimed is:

1. A digital device for measuring an axial load of a torque-shear-type high strength bolt, comprising:
a main body connected to an electromotive wrench fastening a torque-shear-type high strength bolt;
a measuring unit disposed in the main body and measuring an axial load of the torque-shear-type high strength bolt;
a power supply formed in the main body and comprising a power lead-in portion for receiving power from outside and a power lead-out portion for supplying the power to the electromotive wrench; and
a display unit displaying a measuring result of the axial load of the torque-shear-type high strength bolt measured by the measuring unit,
wherein the measuring unit comprises:
a current detector for detecting alternating current (AC) supplied to the electromotive wrench through a current sensor using a DC voltage of 0 to 5V;
a sampling unit for performing sampling within a preset range with respect to the electric current detected by the current detector; and
a calculation unit for analyzing a data value sampled by the sampling unit based on an axial load calculation algorithm and calculating the axial load.

2. The digital device according to claim 1, further comprising:
an output unit formed in the main body and outputting data measured by the measuring unit to the outside.

3. The digital device according to claim 1, further comprising:
a connector formed in the main body and connected to a separate terminal such that the measuring unit can be repaired, maintained and managed through the terminal.

4. The digital device according to claim 1, wherein the measuring unit further comprises a data storage unit which stores measurement data of the axial load according to time calculated by the calculation unit.

5. The digital device according to claim 1, wherein the sampling unit starts sampling within the preset range when a signal of a first level or more is sensed after a signal sensed by the current detector is lower than or equal to the first level and is continued for a first period of time or more, and terminate the sampling when a signal sensed by the current detector is lower than or equal to a second level and is continued for a second period of time.

6. The digital device according to claim 1, wherein the calculation unit sets a maximum value, among data collected within a predetermined period of time till a time point of terminating the sampling, as a maximum current level immediately before fracture of a pintail of the torque-shear-type high strength bolt.

7. The digital device according to claim 6, wherein the calculation unit sets the maximum current level as a reference level, stores all of the data collected within the predetermined period of time up to termination of sampling in the data storage unit, calculates the sum of data higher than the reference level by a predetermined level or more among the data according to the axial load calculation algorithm, and substitutes the sum to a preset formula to calculate the axial load.

8. A method for measuring an axial load of a torque-shear-type high strength bolt, comprising:
the first step of obtaining an accumulated current amount from an electromotive wrench fastening a torque-shear-type high strength bolt until a pintail of the torque-shear-type high strength bolt is fractured;

the second step comprising the step of measuring an axial load of the torque-shear-type high strength bolt according to a normal condition and abnormal conditions, the step of quantifying the axial load by weighting the axial load measured according to the conditions; and the step of searching the accumulated current amount in a one-to-one relationship with the axial load;

the third step comprising the step of setting a maximum current amount, at a time point when the pintail of the torque-shear-type high strength bolt is fractured, as a reference value, and sampling data by quantifying the accumulated current amount into equal divisions in a unit of 10%, the step of applying variance analysis to the axial load and accumulated current amount quantified at the second step through a statistical management method, and the step of calculating a regression analysis estimating expression between the value obtained by integrating the data and the axial load; and the fourth step of estimating the axial load from the accumulated current amount through the regression analysis estimating expression.

9. The method according to claim 8, further comprising, after the fourth step, the fifth step of testing whether the axial load estimated from the accumulated current amount is within reliability of 95%.

10. The method according to claim 9, wherein the fifth step comprises performing reliability testing using twin-t test.

11. The method according to claim 8, wherein the first step comprises setting the maximum current amount, at a time point when the pintail of the torque-shear-type high strength bolt is fractured, as the reference value, and setting a certain time point, before the time point when the pintail of the torque-shear-type high strength bolt is fractured, to obtain the accumulated current amount from the certain time point to the time point when the pintail of the torque-shear-type high strength bolt is fractured.

12. The method according to claim 8, wherein the following regression analysis estimating expression 1 is obtained using data corresponding to 30% from a maximum current level of the electric current accumulated for 1.5 seconds before the time point when the pintail of the torque-shear-type high strength bolt is fractured $$Y = 24.78 + 0.02333X \quad \text{[Regression Analysis Estimating Expression 1]}$$

where Y is a target axial load (kN) and X is an accumulated current amount (A) obtained from the electromotive wrench.

13. The method according to claim 8, wherein the following regression analysis estimating expression 2 is obtained using data corresponding to 60% from the maximum current level of the electric current accumulated for 1.5 seconds before the time point when the pintail of the torque-shear-type high strength bolt is fractured $$Y = 55.74 + 0.02718X \quad \text{[Regression analysis estimating expression 2]}$$

where Y is a target axial load (kN) and X is an accumulated current amount (A) obtained from the electromotive wrench.

\* \* \* \* \*